(12) United States Patent
Woodruff et al.

(10) Patent No.: US 11,577,459 B2
(45) Date of Patent: Feb. 14, 2023

(54) SHIPPING AND HANDLING FLUID FOR A THREE-DIMENSIONAL PRINTER

(71) Applicant: HEWLETT-PACKARD DEVELOPMENT COMPANY, L.P., Spring, TX (US)

(72) Inventors: Shannon Reuben Woodruff, San Diego, CA (US); Thomas M. Sabo, San Diego, CA (US); Hector Lebron, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 204 days.

(21) Appl. No.: 16/604,824

(22) PCT Filed: Mar. 23, 2018

(86) PCT No.: PCT/US2018/024052
§ 371 (c)(1),
(2) Date: Oct. 11, 2019

(87) PCT Pub. No.: WO2019/182613
PCT Pub. Date: Sep. 26, 2019

(65) Prior Publication Data
US 2021/0001553 A1  Jan. 7, 2021

(51) Int. Cl.
| | |
|---|---|
| *B29C 64/35* | (2017.01) |
| *B33Y 30/00* | (2015.01) |
| *B29C 64/209* | (2017.01) |
| *B33Y 40/10* | (2020.01) |
| *B65B 55/00* | (2006.01) |
| *B33Y 70/00* | (2020.01) |

(52) U.S. Cl.
CPC ............ *B29C 64/35* (2017.08); *B29C 64/209* (2017.08); *B33Y 30/00* (2014.12); *B33Y 40/10* (2020.01); *B33Y 70/00* (2014.12); *B65B 55/00* (2013.01)

(58) Field of Classification Search
CPC .............................. B28B 1/001; B41J 2/17533
See application file for complete search history.

(56) References Cited

U.S. PATENT DOCUMENTS

| | | |
|---|---|---|
| 8,007,548 B2 | 8/2011 | McGorrin |
| 8,360,568 B2 | 1/2013 | Diederen et al. |
| 8,596,746 B2 | 12/2013 | Curcio et al. |
| 2005/0080191 A1* | 4/2005 | Kramer .................. B33Y 70/00 525/191 |
| 2008/0087188 A1* | 4/2008 | Kabalnov .............. C09D 11/40 106/31.6 |
| 2008/0265211 A1 | 10/2008 | Rehman et al. |
| 2013/0010036 A1 | 1/2013 | Conner et al. |
| 2015/0307687 A1 | 10/2015 | Yamazaki et al. |
| 2016/0264803 A1 | 9/2016 | Nakamura et al. |

(Continued)

FOREIGN PATENT DOCUMENTS

WO  WO-2017131758 A1  8/2017

*Primary Examiner* — Mary Lynn F Theisen
(74) *Attorney, Agent, or Firm* — HP Inc. Patent Department (57) ABSTRACT

An example of a shipping and handling fluid for a three-dimensional (3D) printer is disclosed. The shipping and handling fluid includes a co-solvent, a first sugar alcohol, a second sugar alcohol, a surfactant, and a balance of water. The first sugar alcohol includes a ring structure, and the second sugar alcohol has a linear structure.

16 Claims, 4 Drawing Sheets

(56) References Cited

U.S. PATENT DOCUMENTS

2016/0326390 A1* 11/2016 Farrugia ................ C09D 11/30
2017/0320328 A1   11/2017 Voss et al.
2019/0241756 A1*  8/2019 Doumaux .............. C09D 11/38

* cited by examiner

SHIPPING AND HANDLING FLUID FOR A THREE-DIMENSIONAL PRINTER

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

Inkjet printing has also been used to print liquid functional agents in some three-dimensional (3D) printing techniques. 3D printing may be an additive printing process used to make three-dimensional solid parts from a digital model. 3D printing is often used in rapid product prototyping, mold generation, mold master generation, and short run manufacturing.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Shipping and handling fluids may be used in printheads and printbar assemblies of inkjet printers. These fluids may be introduced into the printer fluidic system and may be maintained therein during shipping and/or storage. The fluids may be used, in part, to keep air bubbles from forming in the fluidic system prior to the first use of the inkjet printer. These fluids are purged from the fluidic system prior to printing with ink.

It has been found that some shipping and handling fluid formulations for inkjet printers may not be suitable for use in a three-dimensional (3D) printer, due, in part to the high temperatures used in 3D printing, which in some instances may reach up to 300° C. For example, sugars may be included in shipping and handling fluid formulations to serve as densifying agents. However, the present inventors have found that when exposed to the high temperatures of 3D printing, these sugars may undergo oxidation and decomposition, a process referred to as caramelization or browning. Thermal browning of the sugar(s) results in color changes of the sugar-containing shipping and handling fluid. This color change can alter the color of 3D parts that are printed immediately following the purging of the sugar-containing shipping and handling fluid from the printbar assembly. This altered color of the printed 3D part is the result of residual sugar-containing shipping and handling fluid within the printbar fluidic system, and may be undesirable in some instances.

It has also been found that the solids components of the sugar-containing shipping and handling fluid formulations may undergo crystal formation within the fluidic system of the printbar assembly during prolonged storage. Such crystallization may ultimately interfere with the subsequent purging of the sugar-containing shipping and handling fluid from the fluidic system, impede the flow of liquid functional agents through the fluid lines, and/or otherwise interfere with subsequent print processes of the 3D printer.

Moreover, the ability of any shipping and handling fluid to be purged from the printer fluidic system is influenced by several physical properties and characteristics of the shipping and handling fluid, including the solids content, density, surface tension and viscosity. Given the differences in operating temperature of an inkjet printer and a 3D printer, the physical properties and characteristics of shipping and handling fluid formulations for inkjet printers may not be suitable for 3D printers.

The shipping and handling fluid disclosed herein is formulated for a 3D printer such that it exhibits thermal stability at the high printing temperatures (i.e., can withstand the temperature without caramelizing or undergoing other browning reactions, such as, e.g., Maillard reactions, etc.), includes a suitably high solids content for densification that is also resistant to crystal formation upon prolonged storage, and exhibits density, viscosity and surface tension characteristics that enable the fluid to be readily purged from the fluidic system of a printbar assembly.

The shipping and handling fluid disclosed herein comprises a co-solvent, a first sugar alcohol including a ring structure, a second sugar alcohol having a linear structure, a surfactant, and a balance of water. In the examples disclosed herein, the liquid components of the shipping and handling fluid may be referred to as a vehicle. It is to be understood that the vehicle includes any of the liquid components to which the sugar alcohols are added. As an example, the vehicle may include the co-solvent, surfactant, water, etc. In a specific example, the vehicle consists of a co-solvent, surfactant having a surface tension of at least 34 dynes/cm, a balance of water, and no other additives. In another example, the vehicle includes a co-solvent, surfactant having a surface tension of at least 34 dynes/cm, a balance of water, other additives, such as an anti-kogation agent, a buffer, a biocide, or combinations thereof.

The shipping and handling fluid includes the co-solvent(s). The co-solvent is a water miscible solvent. The co-solvent may include an organic solvent. Classes of suitable organic co-solvents that may be used in the vehicle include aliphatic alcohols, aromatic alcohols, diols, glycol ethers, polyglycol ethers, pyrrolidones (also known as pyrrolidinones), caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, dimethyl sulfoxide (DMSO), isopropyl alcohol, ethanol, pentanol, acetone, and the like. In an example, the co-solvent is selected from the group consisting of 2-pyrrolidone, 1,2-propanediol, 2-methyl-1,3-propanediol, diethylene glycol, 1-(2-hydroxyethyl)-2-pyrrolidinone, 1-methyl-2-pyrrolidone, 1,5-pentanediol, 2-ethyl-2-(hydroxymethyl)-1,3-propanediol, N-(2-hydroxyethyl)-2-pyrrolidone, 1,6-hexanediol, imidazole, and combinations thereof.

The co-solvent is present in the shipping and handling fluid an amount ranging from about 1 wt % to about 7 wt % based on a total weight of the shipping and handling fluid. In an example, the co-solvent is present in an amount ranging from 5 wt % to about 7 wt % based on the total weight of the shipping and handling fluid. It has been found that including more of the co-solvent may increase the viscosity of the shipping and handling fluid, which can deleteriously affect the ability of the fluid to be purged from the printhead.

The shipping and handling fluid includes a combination of two different sugar alcohols. The sugar alcohols of the shipping and handling fluid include a first sugar alcohol including a ring structure, and a second sugar alcohol having a linear structure. In the examples disclosed herein, the different sugar alcohols reduce crystallization, increase fluid density, and do not deleteriously affect the color of 3D parts printed with the 3D printer.

It has been found that when water vapor is transmitted from fluid(s), for example, as a result of prolonged storage in the liquid delivery system, some of the solid component (s) may crystallize. In the examples disclosed herein, however, the different structures of the sugar alcohols mitigate or prevent the formation of crystals within the liquid delivery system of the 3D printer. In particular, the complexity of the combination of the ring and linear structures prevents the sugar alcohol molecules from organizing in the form of crystals. Some (hyper)branched structures can also reduce the likelihood of crystallization.

The combination of sugar alcohols in the shipping and handling fluid also serves as a densifying agent without excessively increasing the solids content of the fluid. Excessive solids may destabilize the fluid, i.e., deleteriously affect the print and purge ability of the fluid, and can increase the likelihood of crystallization. The combination of sugar alcohols in the examples disclosed herein aids in achieving a fluid density greater than 1.16 g/cm³, which improves purgeability, while maintaining a solids level at or below 45% (e.g., 40%), which improves the fluid's stability. As used herein, "purgeability" refers to the ability of the fluid to be efficiently flushed from the 3D printer, e.g., by a purging technique or by printing).

It has also been found that the combination of sugar alcohols exhibits thermal stability. As used herein, "thermal stability" means that the sugar alcohols do not undergo browning reactions at the printing temperatures (i.e., ranging, for example, from about 160° C. to about 300° C.). The combination of the sugar alcohols does not brown or caramelize when heated to the temperatures used in the 3D printing process. As such, the sugar alcohols, and the shipping and handling fluid including them, do not affect the color of 3D parts printed with the 3D printer. In use, the shipping and handling fluid is removed from the 3D printer prior to 3D printing with a liquid functional agent. However, in some instances, some of the shipping and handling fluid may remain within the liquid delivery system even after removal has taken place. Removal may be accomplished through purging or printing. Purging may involve the application of pressure to remove the fluid from the liquid delivery system, and printing may involve firing the shipping and handling fluid out of the printhead nozzles in the same operational manner that is used for the liquid functional agent. In these instances, the shipping and handling fluid will be applied on at least some of the build material used in the 3D print process. As mentioned above, the sugar alcohols of the shipping and handling fluid disclosed herein are thermally stable, and thus do not undergo browning reactions at the 3D print temperatures, and thus do not impart an undesirable brown color to the part.

In the examples disclosed herein, the first sugar alcohol is selected from the group consisting of maltitol, lactitol, isomalt, and combinations thereof, and the second sugar alcohol is selected from the group consisting of xylitol, erythritol, sorbitol, mannitol, and combinations thereof. The structure of each of the first sugar alcohols is shown below:

The structure of each of the second sugar alcohols is shown below:

(xylitol) (erythritol) (sorbitol) (mannitol)

Each of the sugar alcohols may be used in pure form, or in another form. An example of another form may be a syrup, such as LYCASIN® 80/55 (a maltitol syrup including at least 50% maltitol, available from Roquette). The other sugar alcohols disclosed herein may also be used in syrup form. In an example, a suitable first and second sugar alcohol combination is maltitol and xylitol. Any combination of the ring and linear sugar alcohols may be used, as long as wt % and density of the fluid is as described herein.

The first sugar alcohol is present in an amount ranging from about 15 wt % to about 30 wt %, based on a total weight of the shipping and handling fluid, and the second sugar alcohol is present in an amount ranging from about 10 wt % to about 25 wt %, based on the total weight of the shipping and handling fluid. In one example, each of the first sugar alcohol and the second sugar alcohol is present in an amount ranging from about 15 wt % to about 25 wt %. It is to be understood that the solubility of the sugar alcohol in water may affect the amount used in any given formulation. For example, the solubility of xylitol in water is higher than the solubility of mannitol in water, and thus higher amounts of xylitol may be used as compared to mannitol. As a specific example, when xylitol is selected as the second sugar alcohol, a suitable range may be from about 15 wt % to about 25 wt %, and when mannitol is selected as the second sugar alcohol, a suitable range may be from about 10 wt % to about 15 wt %. Moreover, the amounts of the sugar alcohols may also depend upon the desired total solids for the shipping and handling fluid, which in an example, is 45 wt % or less based on the total weight of the shipping and handling fluid. In some examples, the sugar alcohols account for a majority, if not all, of the solutes present in the shipping and handling fluid.

As such, in an example disclosed herein, the combination of the first sugar alcohol and the second sugar alcohol exhibits thermal stability at a temperature from about 160° C. to about 300° C., and the combination of the first sugar alcohol and the second sugar alcohol is present in an amount less than 45 wt % based on the total weight of the shipping and handling fluid.

The shipping and handling fluid also includes a surfactant. The surfactant is selected to enhance the purgeability (i.e., removability) of the shipping and handling fluid from the 3D printer. As mentioned herein, purgeability refers to the ability of the fluid to be efficiently flushed from the 3D printer. In the examples disclosed herein, it has been found that the surfactant should render the shipping and handling fluid with a surface tension ranging from about 40 dynes/cm to about 50 dynes/cm. The selection of the surfactant may be influenced by the presence of other components of the shipping and handling fluid. In an example, the surfactant of the shipping and handling fluid has a surface tension of at least 34 dynes/cm, which contributes to the relatively high surface tension of the fluid.

In an example, the surfactant is alkyldiphenyloxide disulfonate. Examples of commercially available alkyldiphenyloxide disulfonates include DOWFAX™ 2A1 (surface tension 34 or 35 dynes/cm) and/or DOWFAX™ 8390 (surface tension 44 or 46 dynes/cm) (both anionic alkyldiphenyloxide disulfonates available from The Dow Chemical Co.). Other suitable examples of the surfactant may include DOWFAX™ 3B2 (surface tension 37 or 38 dynes/cm), DOWFAX™ C6L (surface tension 34 dynes/cm), DOWFAX™ C10L (surface tension 35 or 37 dynes/cm) and DOWFAX™ 30599 (surface tension 34 dynes/cm) (all also available from The Dow Chemical Co.).

Whether a single surfactant is used or a combination of surfactants is used, the surfactant(s) is/are present in an amount of equal to or less than 1 wt % based on a total weight of the shipping and handling fluid. In an example, the surfactant(s) is/are present in an amount ranging from about 0.2 wt % to about 0.6 wt %. In another example, the surfactant(s) is/are present in an amount ranging from about 0.2 wt % to about 0.4 wt %.

In one specific example, the surfactant is alkyldiphenyloxide disulfonate, and the surfactant is present in an amount equal to or less than 1 wt % based on the total weight of the shipping and handling fluid.

In examples of the shipping and handling fluid including the co-solvent(s), the sugar alcohol(s), and the surfactant(s), the balance of the fluid is water.

In other examples of the shipping and handling fluid, in addition to the previously discussed components, the fluid may also include one or more additives. Suitable additives include a dye, an anti-kogation agent, a buffer, a biocide, or combinations thereof.

In some examples, the shipping and handling fluid may also include a dye. The dye may be included to impart color to the shipping and handling fluid, and may be included as a tinting agent to aid in the visualization of the shipping and handling fluid. The amount of dye that may be present in the shipping and handling fluid ranges from about 0.1 wt % to about 1 wt %, based on a total weight of the shipping and handling fluid. In an example, the amount of dye is about 0.1 wt %, based on the total weight of the shipping and handling fluid. Examples of the colors include cyan, magenta, yellow, etc. Examples of suitable dyes include azo dyes, phthalocyanine dyes, direct dyes, vat dyes, sulfur dyes, organic dyes, reactive dyes, disperse dyes, acid dyes, or basic dyes. Some specific dyes include Acid Yellow 23 (AY 23), Acid Yellow 17 (AY 17), Acid Red 52 (AR 52), Acid Red 289 (AR 289), Reactive Red 180 (RR 180), Direct Blue 199 (DB 199), PRO-JET™ Fast Magenta 2 Liquid (an azo dye from Fujifilm, USA), PRO-JET™ Cyan 854 (an azo dye from Fujifilm, USA), and PRO-JET™ Black 168 (an azo dye from Fujifilm, USA). Other suitable dyes may include near-infrared dyes (e.g., anthroquinones, metal dithiolenes, cyanine dyes, perylenediimide dyes, croconium dyes, pyrilium or thiopyrilium dyes, boron-dipyrromethene dyes, or aza-boron-dipyrromethene dyes). Other colorants, such as plasmonic resonance absorbers (e.g., inorganic pigments, such as lanthanum hexaboride ($LaB_6$), tungsten bronzes ($A_xWO_3$), indium tin oxide ($In_2O_3$:$SnO_2$, ITO), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCu_yP_2O_7$)) may also be used instead of the dye.

An anti-kogation agent may be included in the shipping and handling fluid. Kogation refers to the deposit of dried solids (e.g., from the shipping and handling fluid) on a print head of the print bar assembly. Anti-kogation agent(s) may be included to assist in preventing the buildup of kogation during storage. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the shipping and handling fluid may range from greater than 0.1 wt % to about 0.7 wt % based on a total weight of the shipping and handling fluid. In an example, the oleth-3-phosphate is included in an amount ranging from about 0.1 wt % to about 0.7 wt %. In another example, the oleth-3-phosphate is included in an amount ranging from about 0.1 wt % to about 0.4 wt %.

A buffering agent (i.e., buffer) may also be included in the shipping and handling fluid. In an example, the buffering agent may be included in an amount ranging from about 0.005 wt % to about 0.2 wt % based on a total weight of the shipping and handling fluid. In an example, the buffering agent may be included in an amount of about 0.1 wt % based on the total weight of the shipping and handling fluid. A suitable example of a buffering agent is Tris (i.e., tris (hydroxymethyl)aminomethane).

The shipping and handling fluid may also include a biocide. Suitable biocides may include antimicrobial agents and fungicides. Examples of suitable biocides include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof.

In an example, the shipping and handling fluid may include a total amount of biocide(s) that ranges from about 0.01 wt % to about 0.5 wt %. In an example, the biocide is present in the shipping and handling fluid in an amount ranging from about 0.06 wt % to about 0.18 (based on a total weight of the shipping and handling fluid).

In any of the examples disclosed herein, the balance of the shipping and handling fluid is water. As an example, deionized water may be used. The amount of water may vary depending upon the amounts of the other components. In an example, the amount ranges from about 50 wt % to about 70 wt %.

The physical properties and characteristics of the shipping and handling fluid may affect the fluid's ability to efficiently and successfully be purged from the 3D printer. The ability of the shipping and handling fluid to be purged may be affected by the surface tension, density, solids content, and viscosity which may each individually be affected by the type and amount of the individual constituents of the shipping and handling fluid, including the densifying agent, co-solvent and surfactant.

For example, density, viscosity and solids content of the shipping and handling fluid is largely influenced by the type and amount of densifying agent that is used. In the examples disclosed herein, the sugar alcohols may be used as densifying agents, in part because they can increase the density (which improves the purgeability) without excessively increasing the solids content or viscosity (which can deleteriously affect purgeability). In an example, the density of the shipping and handling fluid is >1.16 $g/cm^3$. In an example, the viscosity of the shipping and handling fluid ranges from about 6 cP to <10 cP. In an example, the total solids content of the shipping and handling fluid is less than 45 wt %, based on a total weight of the shipping and handling fluid.

The surface tension of the shipping and handling fluid may be influenced by the type and amount of surfactant used. In the examples disclosed herein, the surfactant of the shipping and handling fluid has a surface tension of at least 34 dynes/cm. A surfactant having this minimum surface tension can increase the surface tension of the entire fluid. In an example, the surface tension of the shipping and handling fluid ranges from about 40 dyne/cm to about 50 dyne/cm.

In one specific example of the shipping and handling fluid, a viscosity of the shipping and handling fluid ranges from about 6 cP to <10 cP; or a density of the shipping and handling fluid is >1.16 $g/cm^3$; or a surface tension of the shipping and handling fluid ranges from about 40 dyne/cm to about 50 dyne/cm; or combinations.

Figure 1:
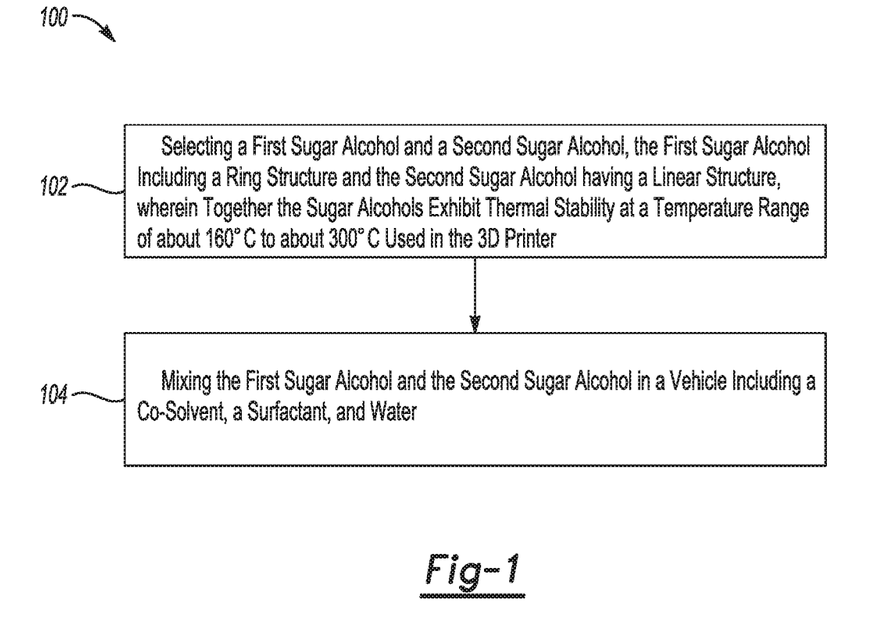
FIG. 1 is a flow diagram illustrating an example of a method of making an example of a shipping and handling fluid for an example of a 3D printer.

Also disclosed herein is a method of making the shipping and handling fluid. An example of this method 100 is shown in FIG. 1. As shown in FIG. 1, the shipping and handling fluid may be prepared by selecting a first sugar alcohol and a second sugar alcohol, the first sugar alcohol including a ring structure and the second sugar alcohol having a linear structure, wherein together the sugar alcohols exhibit thermal stability at a temperature range of about 160° C. to about 300° C. used in the 3D printer (reference numeral 102); and mixing the first sugar alcohol and the second sugar alcohol in a vehicle including a co-solvent, a surfactant, and water (reference numeral 104).

It is to be understood that any examples and/or amounts of the first and second sugar alcohols, the co-solvent, and the surfactant described herein may be used in the method 100. As an example, the selected first and second sugar alcohols may be mixed into the vehicle such that: the first sugar alcohol is present in an amount ranging from about 15 wt % to about 30 wt %, based on a total weight of the shipping and handling fluid, the second sugar alcohol is present in an amount ranging from about 15 wt % to about 25 wt %, based on the total weight of the shipping and handling fluid and the combination of the first sugar alcohol and the second sugar alcohol is present in an amount less than 45 wt % based on the total weight of the shipping and handling fluid.

In some examples, the vehicle is prepared, and then the sugar alcohols are mixed with the vehicle at room temperature (e.g., a temperature ranging from about 18° C. to about 25° C.). The sugar alcohols (densifying agents) may be dissolved in the solution within a few seconds (e.g., less than 10 seconds). In other instances, the sugar alcohols may take several hours to dissolve, as the dissolution is endothermic (negative heat of solution). Upon dissolution, the sugar alcohols increase the density of the shipping and handling fluid.

In other examples, the sugar alcohols may be first dissolved in water to form a solution, and then the solution may be incorporated into the remainder of the vehicle (i.e., the co-solvent, surfactant, and in some instances, more water).

As mentioned above, the shipping and handling fluid may include additive(s) selected from the group consisting of an anti-kogation agent, a buffering agent, a biocide and a combination thereof. When one or more of these additives are included, the method 100 may further include incorporating the additive(s) into the vehicle, either before or after the sugar alcohols are added.

In still another example, the method 100 further comprises adding a dye to the vehicle. Any of the dyes and/or amounts of the dyes disclosed herein may be used in the method 100.

Figure 2:
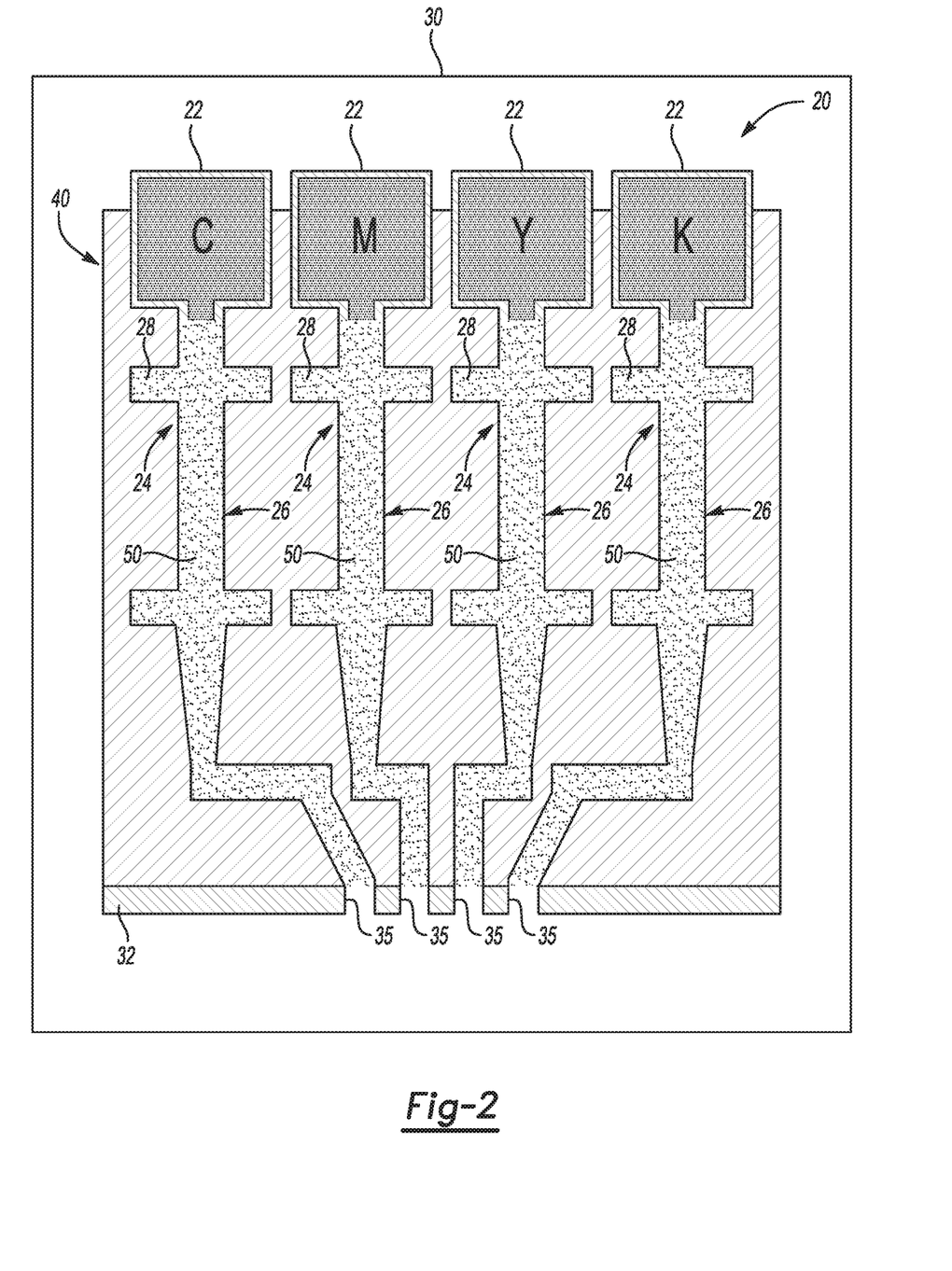
FIG. 2 is a semi-schematic and cross-sectional view of an example of a printbar assembly disclosed herein.

Referring now to FIG. 2, an example of a printbar assembly 20 for a three-dimensional printer 30 is depicted. The printbar assembly 20 includes a liquid functional agent supply 22. In the example depicted in FIG. 2, individual liquid functional agent containers for colors cyan (C), magenta (M), Yellow (Y) and Black (K) are referred to collectively as the liquid functional agent supply 22. In examples, the liquid functional agent supply 22 may have any number of individual liquid functional agent containers. For example, there may be one individual liquid functional agent container, two individual liquid functional agent containers, 32 individual liquid functional agent containers or any suitable number of individual liquid functional agent containers to collectively add up to the liquid functional agent supply 22. The liquid functional agent(s) may be any liquid functional agent, such as a fusing agent, a binding agent, etc. used in the 3D printer 30.

The printbar assembly 20 includes a liquid delivery system 24 in selective fluid communication with the liquid functional agent supply 22. In the example depicted in FIG. 2, the liquid delivery system 24 includes four separate passages 26 defined in at least one printhead 40 to channel fluid flow from the liquid functional agent supply 22 to a plurality of nozzles 35 included in a die 32. The passages 26 may have varying cross-sectional areas along a flow path. For example, the passages 26 may have chambers 28 along the flow path with larger or narrower flow cross-sectional areas compared to an adjacent section of the passage 26. It is to be understood that the liquid delivery system 24 may include tubes (not shown) intervening between the printhead 40 and the liquid functional agent supply 22.

The printbar assembly 20 includes the at least one printhead 40 which includes the die 32 having the plurality of nozzles 35 in selective fluid communication with the liquid delivery system 24. The passages 26 may have branches such that each passage leads to a plurality of nozzles 35. As such, each of the passages 26 may include a manifold (not shown). The printhead 40 may also include elements (not shown) for selectively causing the emission of droplets or a stream of a liquid functional agent or of the shipping and handling fluid 50 from the nozzles 35. Examples of the elements include thermal resistors or piezoelectric actuators. As such, the printhead may be a thermal inkjet printhead or a piezoelectric printhead.

In the example of the present disclosure as depicted in FIG. 2, the shipping and handling fluid 50 disclosed herein is loaded in the liquid delivery system 24. As discussed herein, the shipping and handling fluid 50 is stable at a printing temperature range of the 3D printer 30. As mentioned above, stable at a printing temperature range means that the shipping and handling fluid 50 does not undergo a chemical reaction within the printing temperature range. For example, the shipping and handling fluid 50 does not undergo a chemical reaction that causes a color change if a residual amount of the shipping and handling fluid 50 is mixed with the liquid functional agent and subjected to jet delivery temperatures or temperatures in the print bed (i.e., build platform).

To further illustrate the present disclosure, examples are given herein. It is to be understood that these examples are provided for illustrative purposes and are not to be construed as limiting the scope of the present disclosure.

EXAMPLES

Example 1

Two comparative shipping and handling fluids with the same formulation were prepared and tested for the effect on part color as well as crystallization within the printbar assembly. The comparative shipping and handling fluid composition is shown in Table 1, with the wt % of each component that was used.

TABLE 1

| Ingredient | Specific component | comp SHF 1 (wt %) | comp SHF 2 (wt %) |
|---|---|---|---|
| Co-solvent | 2-pyrrolidone | 5.00 | 5.00 |
| Densifying agent | Sucrose | 30.00 | 30.00 |
| | Sorbitol | 15.00 | 15.00 |
| Surfactant | TERGITOL ™ 15-S-7 (The Dow Chemical Co.) | 0.50 | 0.50 |
| Anti-kogation agent | CRODAFOS ™ O3A (Croda Int.) | 0.10 | 0.10 |
| Buffering agent | TRIS | 0.10 | 0.10 |
| Biocide | ACTICIDE ® B20 (Thor Chemicals) | 0.04 | 0.04 |
| | ACTICIDE ® M20 (Thor Chemicals | 0.02 | 0.02 |
| Colorant | Acid Red-52 (AR52) | 0.1 | 0.1 |
| Water | Deionized water | Balance | Balance |

A first red and blue part was 3D printed from a 3D printbar that had been in use and thus did not have a shipping and handling fluid therein. This part exhibited the desired red and blue colors.

A second red and blue part (based on the same 3D object model as the first red and blue part) was 3D printed from a 3D printbar that had comparative SHF 2 stored in the fluid components thereof. Comparative SHF 2 was printed from the printer, and then the part was 3D printed. The blue color of the second printed part had a yellowish-greenish hue, and the red color has a brownish hue. It was determined that the discoloration of the second part was due to the thermal instability of the residual comparative SHF 2 in the printbar.

Comparative SHF 1 was stored in a different printbar at ambient conditions (about 25° C. and about 1 atm) for an extended period of time (up to one year). During the storage period, crystals were formed on the surface of the fluid interconnect assembly of the printbar. Crystal formation was observed as early as four months into the storage period. It was believed that the crystallization resulted from inevitable water vapor transmission from Comparative SHF 1.

Example 2

Comparative examples of a shipping and handling fluid were prepared. Examples of the shipping and handling fluid disclosed herein were also prepared. The example shipping and handling fluid included xylitol as the first sugar alcohol and maltitol as the second sugar alcohol. The formulations of the example and comparative shipping and handling fluids are shown below in Table 2, with the wt % of each component that was used. As shown, example SHF 1 and comparative example SHF 3 included black dye, and thus was tinted, while example SHF 2 and comparative example SHF 4 did not include black dye, and thus was not tinted.

TABLE 2

| Ingredient | Specific component | Example SHF 1 (wt %) | Example SHF 2 (wt %) | Comp. SHF 3 (wt %) | Comp. SHF 4 (wt %) |
| --- | --- | --- | --- | --- | --- |
| Co-solvent | 2-pyrrolidone | 5.00 | 5.00 | 5.00 | 5.00 |
| Densifying agent | Maltitol | 25.00 | 25.00 | 0 | 0 |
| | Xylitol | 15.00 | 15.00 | 0 | 0 |
| | Sucrose | 0 | 0 | 30.00 | 30.00 |
| | Sorbitol | 0 | 0 | 15.00 | 15.00 |
| Surfactant | DOWFAX ™ 2A1 (Dow Chemical Co.) | 0.20 | 0.20 | 0 | 0 |
| | TERGITOL ™ 15-S-7 (The Dow Chemical Co.) | 0 | 0 | 0.50 | 0.50 |
| Anti-kogation agent | CRODAFOS ™ O3A (Croda Int.) | 0.10 | 0.10 | 0.10 | 0.10 |
| Buffering agent | TRIS | 0.10 | 0.10 | 0.10 | 0.10 |
| Biocide | ACTICIDE ® B20 (Thor Chemicals) | 0.04 | 0.04 | 0.04 | 0.04 |
| | ACTICIDE ® M20 (Thor Chemicals | 0.02 | 0.02 | 0.02 | 0.02 |
| Colorant | PRO-JET ™ 168 (Fujifilm USA) | 0.1 | 0 | 0.1 | 0 |
| Water | Deionized water | Balance | Balance | Balance | Balance |
| pH | | 8-8.5 | 8-8.5 | 8-8.5 | 8-8.5 |

Several dogbones were 3D printed on a testbed printer, and were formed using polyamide powder and a fusing agent (an aqueous formulation including a plasmonic resonance absorber).

To simulate residual shipping and handling fluid left in the fluids of the printed, 10% example SHF 1, example SHF 2, comparative example SHF3, or comparative example SHF 4 was added to the fusing agent. As a control, dogbones were also printed with the fusing agent having no shipping and handling fluid added thereto. Printing time was 20 minutes, and the print bed temperature was about 165° C. These dogbones were not exposed to prolonged heat exposure.

Figure 3:
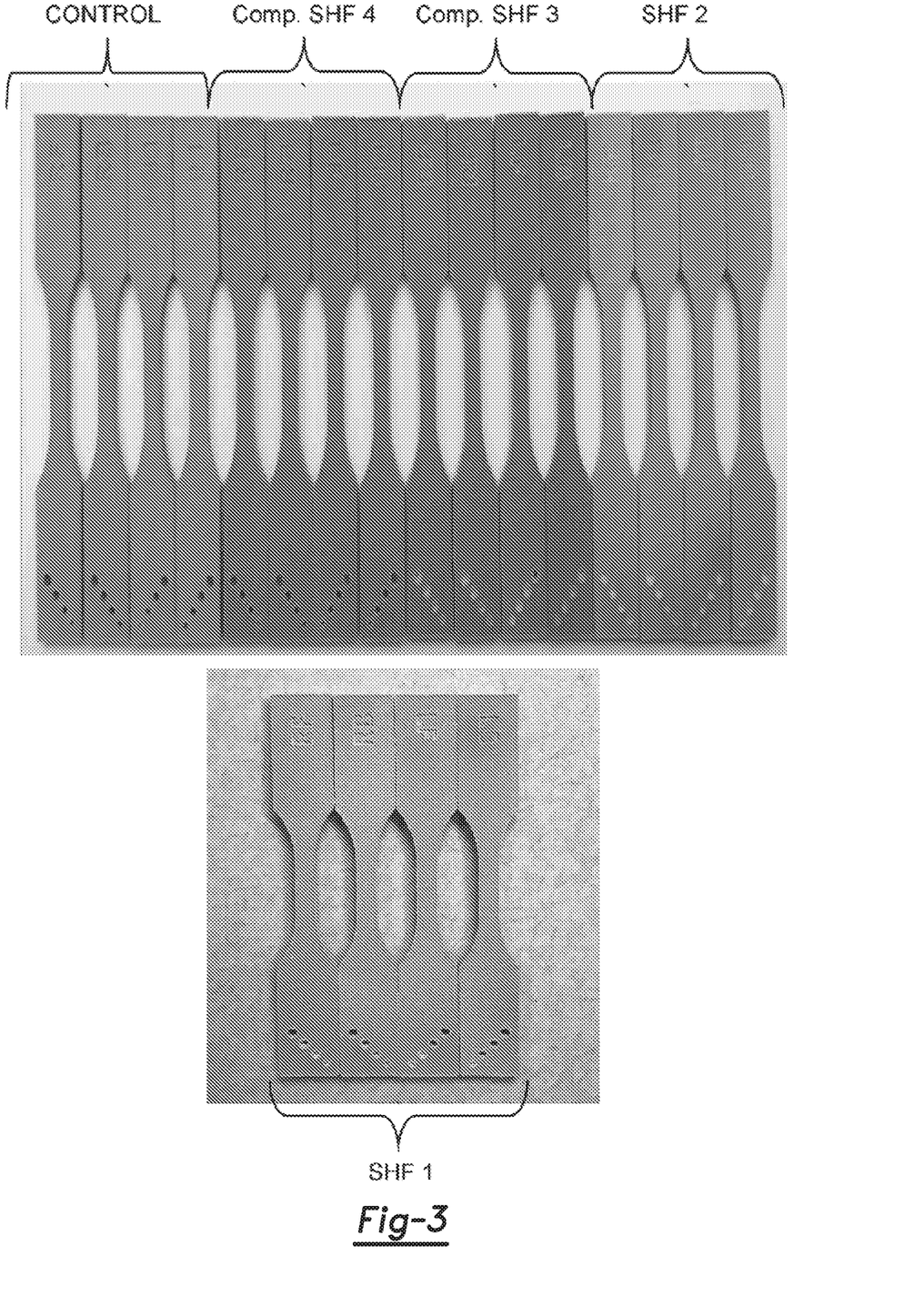
FIG. 3 includes black and white reproductions of originally colored photographs of parts printed with no shipping and handling fluid (CONTROL), with example shipping and handling fluids (SHF 1, SHF 2), and with comparative shipping and handling fluids (Comp. SHF 3, Comp. SHF 4) to simulate the effect of residual amounts of the respective shipping and handling fluids on printed parts.

FIG. 3 depicts all of the dogbones. In this figure, the control parts are labeled "CONTROL", the comparative parts printed with comparative example SHF 4 (no tint) are labeled "Comp. SHF 4", the comparative parts printed with comparative example SHF 3 (tinted) are labeled "Comp. SHF 3", the example parts printed with example SHF 2 (no tint) are labeled "SHF 2", and the example parts printed with example SHF 1 (tinted) are labeled "SHF 1". The observed color, the lightness (L*) values, and the hue angle for each of these part is shown in Table 3.

TABLE 3

| Sample | Observed Color | L* | Hue Angle |
| --- | --- | --- | --- |
| Control | Grey | 71.2 | ~227 |
| Comp. SHF 4 (no tint) | Light brown | 63.05 | ~107 |
| Comp. SHF 3 (tinted) | Light brown | 62.16 | ~109 |
| SHF 2 (no tint) | Grey | 73.52 | ~229 |
| SHF 1 (tinted) | Grey | 72 | ~230 |

The results shown in Table 3 indicate that the tint added to the shipping and handling fluids (example or comparative) did not deleteriously affect the color of the parts, as both the tinted and non-tinted comparative example dogbones were light brown as opposed to grey, had reduced L* values, and had reduced hue angles. It is noted that the L* and the hue angle of the comparative example parts shifted significantly when compared to the control, while the L* and the color angle of the example parts were very close to the control. These results indicate that the saccharide in the comparative SHF 3 and 4 was caramelized, resulting in the significant browning of the comparative example parts.

Figure 4:
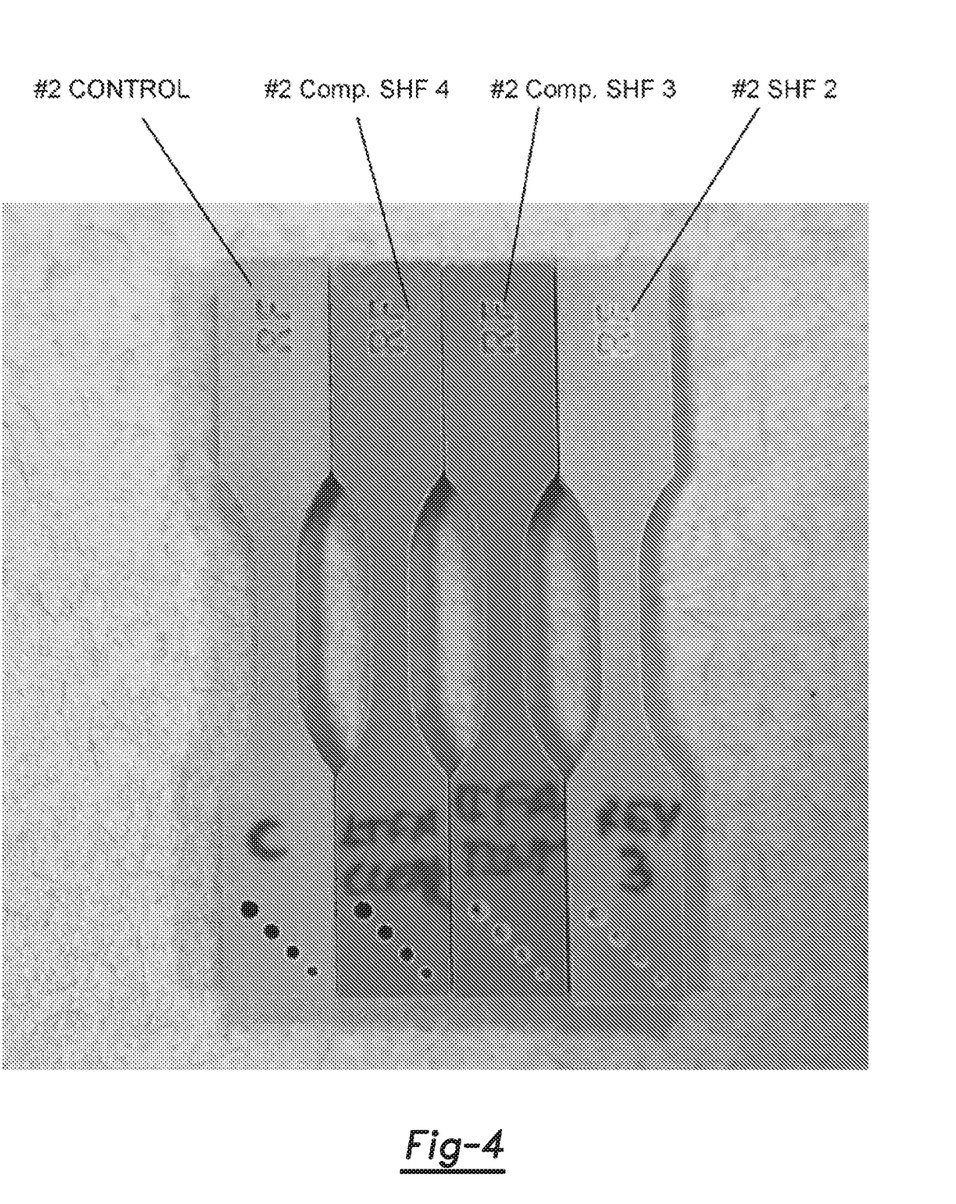
FIG. 4 is a black and white reproduction of an originally colored photograph of parts printed with no shipping and handling fluid (#2 CONTROL), with an example shipping and handling fluid (#2 SHF 2), and with comparative shipping and handling fluids (#2 Comp. SHF 3, #2 Comp. SHF 4) and then exposed to a post bake process.

Four additional dogbones were 3D printed as described in this example with no shipping and handling fluid, with comparative SHF 3 (tint), with comparative SHF 4 (no tint), and with example SHF 2 (no tint). After printing, these dogbones were exposed to 12 additional hours of baking at 165° C. FIG. 4 depicts each of these parts, with the control part on the far left (#2 CONTROL), the comparative part formed with comparative SHF 4 at the center left (#2 Comp. SHF 4), the comparative part formed with comparative SHF 3 at the center right (#2 Comp. SHF 3), and the example part printed with example SHF 2 at the far right (#2 SHF 2).

Again, the control and the example dogbones were grey, while the comparative dogbones were light brown. The additional heat did not discolor the example part, indicating that the shipping and handling fluid disclosed herein is thermally stable.

It is to be understood that the ranges provided herein include the stated range and any value or sub-range within the stated range. For example, from about 1 wt % to about 7 wt % should be interpreted to include not only the explicitly recited limits of from about 1 wt % to about 7 wt %, but also to include individual values, such as about 1.4 wt %, about 2.1 wt %, about 5.25 wt %, about 6 wt %, about 6.95 wt %, etc., and sub-ranges, such as from about 3.5 wt % to about 6.35 wt %, from about 1.15 wt % to about 5.5 wt %, from about 5 wt % to about 7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A shipping and handling fluid for a three-dimensional (3D) printer, comprising:
   a co-solvent;
   a first sugar alcohol including a ring structure;
   a second sugar alcohol having a linear structure;
   a surfactant; and
   a balance of water,
   wherein the shipping and handling fluid is free of a liquid functional agent.

2. The shipping and handling fluid as defined in claim 1 wherein:
   the first sugar alcohol is selected from the group consisting of maltitol, lactitol, isomalt, and combinations thereof; and
   the second sugar alcohol is selected from the group consisting of xylitol, erythritol, sorbitol, mannitol, and combinations thereof.

3. The shipping and handling fluid as defined in claim 2 wherein:
   the first sugar alcohol is present in an amount ranging from about 15 wt % to about 30 wt %, based on a total weight of the shipping and handling fluid; and
   the second sugar alcohol is present in an amount ranging from about 10 wt % to about 25 wt %, based on the total weight of the shipping and handling fluid.

4. The shipping and handling fluid as defined in claim 3 wherein a combination of the first sugar alcohol and the second sugar alcohol exhibits thermal stability at a temperature from about 160° C. to about 300° C., and wherein the combination of the first sugar alcohol and the second sugar alcohol is present in an amount less than 45 wt % based on the total weight of the shipping and handling fluid.

5. The shipping and handling fluid as defined in claim 1 wherein a total solids content is less than 45 wt %, based on a total weight of the shipping and handling fluid.

6. The shipping and handling fluid as defined in claim 1 wherein:
   a viscosity of the shipping and handling fluid ranges from about 6 cP to <10 cP; or
   a density of the shipping and handling fluid is >1.16 g/cm3; or
   a surface tension of the shipping and handling fluid ranges from about 40 dyne/cm to about 50 dyne/cm; or
   combinations thereof.

7. The shipping and handling fluid as defined in claim 1 wherein the co-solvent is present in an amount ranging from about 1 wt % to about 7 wt % based on a total weight of the shipping and handling fluid.

8. The shipping and handling fluid as defined in claim 1 wherein:
   the surfactant is alkyldiphenyloxide disulfonate; and
   the surfactant is present in an amount equal to or less than 1 wt % based on a total weight of the shipping and handling fluid.

9. The shipping and handling fluid as defined in claim 1, further comprising a dye.

10. A method of making a shipping and handling fluid for a three-dimensional (3D) printer, comprising:
    selecting a first sugar alcohol and a second sugar alcohol, the first sugar alcohol including a ring structure and the second sugar alcohol having a linear structure, wherein together the sugar alcohols exhibit thermal stability at a temperature range of about 160° C. to about 300° C. used in the 3D printer; and
    mixing the first sugar alcohol and the second sugar alcohol in a vehicle including a co-solvent, a surfactant, and water,
    wherein the shipping and handling fluid is free of a liquid functional agent.

11. The method as defined in claim 10, further comprising adding a dye to the vehicle.

12. The method as defined in claim 10 wherein:
    the first sugar alcohol is present in an amount ranging from about 15 wt % to about 30 wt %, based on a total weight of the shipping and handling fluid;
    the second sugar alcohol is present in an amount ranging from about 10 wt % to about 25 wt %, based on the total weight of the shipping and handling fluid; and
    a combination of the first sugar alcohol and the second sugar alcohol is present in an amount less than 45 wt % based on the total weight of the shipping and handling fluid.

13. A printbar assembly for a three-dimensional (3D) printer, comprising:
    a liquid functional agent supply;
    a liquid delivery system in selective fluid communication with the liquid functional agent supply;
    at least one printhead including a die having a plurality of nozzles in selective fluid communication with the liquid delivery system; and
    a shipping and handling fluid loaded in the liquid delivery system, the shipping and handling fluid including:
      a co-solvent;
      a first sugar alcohol including a ring structure and present in an amount ranging from about 15 wt % to about 30 wt %, based on a total weight of the shipping and handling fluid;
      a second sugar alcohol having a linear structure and present in an amount ranging from about 10 wt % to about 25 wt %, based on the total weight of the shipping and handling fluid;
      a surfactant; and
      a balance of water.

14. The printbar assembly as defined in claim 13 wherein the at least one printhead is a thermal inkjet printhead or a piezoelectric printhead.

15. A 3D printer, comprising the printbar assembly as defined in claim 13.

16. The shipping and handling fluid as defined in claim 1 wherein the first sugar alcohol is maltitol present in an amount of from about 15 wt % to about 25 wt % and the second sugar alcohol is xylitol present in an amount of from about 10 wt % to about 15 wt %, and wherein the shipping and handling fluid is thermally stable during printing by the 3D printer.

* * * * *